US010445564B2

(12) United States Patent
Kang et al.

(10) Patent No.: US 10,445,564 B2
(45) Date of Patent: Oct. 15, 2019

(54) METHOD AND DEVICE FOR RECOGNIZING FACIAL EXPRESSIONS

(71) Applicant: Industrial Technology Research Institute, Hsinchu (TW)

(72) Inventors: Hao-Ping Kang, Taipei (TW); Jia-Hua Wu, Tainan (TW); Yao-Chin Yang, Hsinchu County (TW); Chih-Chung Kao, Pingtung County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 35 days.

(21) Appl. No.: 15/848,744

(22) Filed: Dec. 20, 2017

(65) Prior Publication Data

US 2019/0188458 A1      Jun. 20, 2019

(30) Foreign Application Priority Data

Dec. 15, 2017   (TW) .............................. 106144166 A

(51) Int. Cl.
  *G06K 9/00*          (2006.01)
  *G06T 7/00*          (2017.01)
(52) U.S. Cl.
  CPC ..... *G06K 9/00302* (2013.01); *G06K 9/00288* (2013.01); *G06T 7/97* (2017.01); *G06T 2207/20081* (2013.01); *G06T 2207/30201* (2013.01)
(58) Field of Classification Search
  None
  See application file for complete search history.

(56) References Cited

U.S. PATENT DOCUMENTS

| 7,142,697 B2 | 11/2006 | Huang et al. |
| 7,239,929 B2 | 7/2007 | Ulrich et al. |
| 7,389,229 B2 | 6/2008 | Billa et al. |

(Continued)

FOREIGN PATENT DOCUMENTS

| CN | 102629321 A | 8/2012 |
| CN | 104361358 A | 2/2015 |

(Continued)

OTHER PUBLICATIONS

Vidar Vikjord, "A New Information Theoretic Clustering Algorithm Using K-NN," 2013 IEEE International Workshop on Machine learning for Signal Processing, Sep. 2013, 6 pages, IEEE, US.

(Continued)

*Primary Examiner* — David Perlman

(57) ABSTRACT

A method for recognizing face expressions is provided. The method includes: recognizing expression categories of expressions in a plurality of face images and obtaining recognition results between each expression category and another expression category; obtaining similarities between each expression category and another expression category according to the recognition results; classifying the expression categories into a plurality of expression groups according to the similarities; training a first recognition model to classify the expressions in the face images into the expression groups; and training a second recognition model for each of the expression groups to classify the face images in each of the expression group into one of the expression categories.

18 Claims, 13 Drawing Sheets

(56) References Cited

U.S. PATENT DOCUMENTS

| | | | |
|---|---|---|---|
| 9,430,697 | B1 | 8/2016 | Iliadis et al. |
| 9,489,943 | B2 | 11/2016 | Ge et al. |
| 2010/0189358 | A1 | 7/2010 | Kaneda et al. |
| 2014/0079297 | A1 | 3/2014 | Tadayon et al. |
| 2016/0148080 | A1 | 3/2016 | Yoo et al. |
| 2017/0032780 | A1 | 3/2017 | Ge et al. |
| 2018/0211164 | A1* | 7/2018 | Bazrafkan ............... G06N 3/088 |
| 2019/0005313 | A1* | 1/2019 | Vemulapalli ....... G06K 9/00295 |
| 2019/0023208 | A1* | 1/2019 | Boston ................ B60R 21/0134 |

FOREIGN PATENT DOCUMENTS

| | | |
|---|---|---|
| TW | 374895 | 11/1999 |
| TW | 201123025 A | 7/2011 |

OTHER PUBLICATIONS

Yunbo Xiong, "Building Text Hierarchical Structure by Using Confusion Matrix," 2012 5$^{th}$ International Conference on BioMedical Engineering and Informatics, Oct. 2012, pp. 1250-1254, IEEE, US.

Tao Li et al., "Music Genre Classification with Taxonomy," 2005 Proceedings of IEEE International Conference on Acoustics, Speech, and Signal Processing, Mar. 2005, V-197-V-200, IEEE, US.

Bo Tao et al., "Template-based Image Retrieval," 1996 Proceedings of the International Conference on Image Processing, Sep. 1996, pp. 871-874, IEEE, US.

Panagiotis Antonopoulos et al., "Hierarchical Face Clustering Using Sift Image Features," Proceedings of the 2007 IEEE Symposium on Computational Intelligence in Image and Signal Processing, Apr. 2007, pp. 325-329, IEEE, US.

Thomas Kindsman et al., "Hierarchical Image Clustering for Analyzing Eye Tracking Videos," 2010 Western New York Image Processing Workshop, Nov. 2010, pp. 58-61, IEEE, US.

Nanhong Ye et al., "An Adaptive Ontology Based Hierarchical Browsing System for CiteSeerx," 2010 Second International Conference on Knowledge and Systems Engineering, Oct. 2010, pp. 203-208, IEEE, US.

Taiwan Patent Office, Notice of Allowance, Patent Application Serial No. 106144166, dated Mar. 27, 2018, Taiwan.

\* cited by examiner

| p \ q | Anger | Disgust | Fear | Happiness | Neutral | Sadness | Surprise |
|---|---|---|---|---|---|---|---|
| Anger | 240 | 11 | 6 | 1 | 4 | 5 | 5 |
| Disgust | 16 | 270 | 7 | 1 | 1 | 11 | 2 |
| Fear | 8 | 15 | 250 | 0 | 2 | 2 | 10 |
| Happiness | 2 | 1 | 0 | 279 | 2 | 0 | 1 |
| Neutral | 7 | 1 | 1 | 1 | 255 | 2 | 0 |
| Sadness | 5 | 5 | 3 | 0 | 2 | 223 | 1 |
| Surprise | 0 | 0 | 15 | 2 | 2 | 1 | 258 |

FIG. 7A

| p \ q | Anger | Disgust | Fear | Happiness | Neutral | Sadness | Surprise |
|---|---|---|---|---|---|---|---|
| Anger |  | 0.044814 | 0.024693 | 0.004158 | 0.016529 | 0.020619 | 0.020619 |
| Disgust | 0.05757 |  | 0.025596 | 0.003697 | 0.003697 | 0.039933 | 0.00738 |
| Fear | 0.031499 | 0.058269 |  | 0 | 0.007968 | 0.007968 | 0.039221 |
| Happiness | 0.007143 | 0.003578 | 0 |  | 0.007143 | 0 | 0.003578 |
| Neutral | 0.0270810 | 0.003914 | 0.003914 | 0.003914 |  | 0.007813 | 0 |
| Sadness | 0.022174 | 0.022174 | 0.013363 | 0 | 0.008929 |  | 0.004474 |
| Surprise | 0 | 0 | 0.056512 | 0.007722 | 0.007722 | 0.003868 |  |

FIG. 7B

| p \ q | Anger | Disgust | Fear | Happiness | Neutral | Sadness | Surprise |
|---|---|---|---|---|---|---|---|
| Anger | | 0.102384 | 0.056191 | 0.011301 | 0.04361 | 0.042793 | 0.020619 |
| Disgust | | | 0.08364 | 0.007275 | 0.007611 | 0.062107 | 0.00738 |
| Fear | | | | 0 | 0.011882 | 0.013363 | 0.095733 |
| Happiness | | | | | 0.011057 | 0 | 0.0113 |
| Neutral | | | | | | 0.016741 | 0.007722 |
| Sadness | | | | | | | 0.008343 |
| Surprise | | | | | | | |

FIG. 7C

| p \ q | Anger/Disgust | Fear | Happiness | Neutral | Sadness | Surprise |
|---|---|---|---|---|---|---|
| Anger/Disgust | 537 | 13 | 2 | 5 | 16 | 7 |
| Fear | 23 | 250 | 0 | 2 | 2 | 10 |
| Happiness | 3 | 0 | 279 | 2 | 0 | 1 |
| Neutral | 8 | 1 | 1 | 255 | 2 | 0 |
| Sadness | 10 | 3 | 0 | 2 | 223 | 1 |
| Surprise | 0 | 15 | 2 | 2 | 1 | 258 |

FIG. 7D

| q \ p | Anger/Disgust | Fear | Happiness | Neutral | Sadness | Surprise |
|---|---|---|---|---|---|---|
| Anger/Disgust |  | 0.02392 | 0.003717 | 0.009268 | 0.02936 | 0.012951 |
| Fear | 0.088011 |  | 0 | 0.007968 | 0.007968 | 0.039221 |
| Happiness | 0.010695 | 0 |  | 0.007143 | 0 | 0.003578 |
| Neutral | 0.03089 | 0.003914 | 0.003914 |  | 0.007813 | 0 |
| Sadness | 0.043867 | 0.013363 | 0 | 0.008929 |  | 0.004474 |
| Surprise | 0 | 0.056512 | 0.007722 | 0.007722 | 0.003868 |  |

FIG. 7E

| q \ p | Anger/Disgust | Fear | Happiness | Neutral | Sadness | Surprise |
|---|---|---|---|---|---|---|
| Anger/Disgust | | 0.111931 | 0.014413 | 0.040158 | 0.073227 | 0.012951 |
| Fear | | | 0 | 0.011882 | 0.021331 | 0.095733 |
| Happiness | | | | 0.020506 | 0.064325 | 0.003578 |
| Neutral | | | | | 0.016741 | 0.007722 |
| Sadness | | | | | | 0.008343 |
| Surprise | | | | | | |

FIG. 7F

METHOD AND DEVICE FOR RECOGNIZING FACIAL EXPRESSIONS

TECHNICAL FIELD

The disclosure relates to a method and a device for recognizing face expressions.

BACKGROUND

In life, people often express emotions through face expressions. Face expressions are some of the most powerful, natural, and immediate ways for humans to communicate their emotions and intentions. The face can express an emotion sooner than people verbalize or even realize their feelings. For example, different emotions are expressed using various face regions, mainly the mouth, the eyes, and the eyebrows.

Face recognition technology is widely used today. For example, a physical store may utilize face expression recognition technology to identify the expressions (e.g., happiness or disgust) of consumers when they browse products or advertisements to obtain ratings gave by consumers on the products or advertisements.

However, current expression recognizers typically assign category labels to expression states, such as "anger" or "sad," relying on signal processing and pattern recognition techniques. A major challenge to such approaches is that human expressive behavior is highly variable and depends on a number of factors. These factors may include the context and domain of the expressive behavior. Therefore, categorical representations for expressions and simple pattern recognition schemes may not accurately recognize face expressions.

Thus, a method and a device for recognizing face expressions are desired to improve the accuracy of face expression recognition.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a device for recognizing face expressions are provided in the disclosure.

In an embodiment, a method for recognizing face expressions is provided in the disclosure. The method comprises: recognizing expression categories of expressions in a plurality of face images and obtaining recognition results between each expression category and another expression category; obtaining similarities between each expression category and another expression category according to the recognition results; classifying the expression categories into a plurality of expression groups according to the similarities; training a first recognition model to classify the expressions in the face images into the expression groups; and training a second recognition model for each of the expression groups to classify the face images in each of the expression groups into one of the expression categories.

In some embodiments, the similarity between a first expression category and a second expression category is obtained according to a cross entropy between the first expression category and the second expression category.

In some embodiments, the similarity is expressed as follows:

$$S(p,q)=H(p,q)+H(q,p)$$

wherein S(p, q) is the similarity between an expression category p and an expression category q, H(p, q) and H(q, p) are the cross entropies between the expression category p and the expression category q, and the cross entropy H(p, q) is expressed as follows:

$$H(p, q) = -\left(\left(1 \times \ln \frac{TP_p}{TP_p + FP_{p,q}}\right) + \left(0 \times \ln \frac{FP_{p,q}}{TP_p + FP_{p,q}}\right)\right)$$

wherein $TP_p$ represents the number of expressions in the face images of the expression category p which are correctly recognized as the expression category p, and $FP_{p,q}$ represents the number of expressions in the face images of the expression category p which are incorrectly recognized as the expression category q.

In some embodiments, the step of classifying the expression categories into the expression groups according to the similarities further comprises: merging two of the expression categories with the highest similarity into an expression group; obtaining the similarities between each unmerged expression category and the expression group; and merging one of the unmerged expression categories and the expression group with the highest similarity or merging two of the unmerged expression categories with the highest similarity into another expression group.

In some embodiments, the step of classifying the expression categories into the expression groups according to the similarities further comprises: obtaining the similarity between the expression group and the other expression group; and merging the expression group and the other expression group with the highest similarity.

In some embodiments, the similarities between each of the unmerged expression categories and the expression group is obtained according to the cross entropies between each of the unmerged expression categories and the expression group.

In some embodiments, the method further comprises: receiving an input image including a face; and recognizing an expression category of an expression in the input image by using the first recognition model and the second recognition model.

In some embodiments, the expression categories comprise anger, disgust, fear, happiness, sadness, and surprise.

In some embodiments, the first recognition model and the second recognition model are based on a convolutional neural network (CNN) model.

In an embodiment, a device for recognizing face expressions is provided. The device comprises one or more processors and one or more computer storage media for storing one or more computer-readable instructions. The processor is configured to drive the computer storage media to execute the following tasks: recognizing expression categories of expressions in a plurality of face images and obtaining recognition results between each expression category and another expression category; obtaining similarities between each expression category and another expression category according to the recognition results; classifying the expression categories into a plurality of expression groups according to the similarities; training a first recognition model to classify the expressions in the face images into the expression groups; and training a second recognition model for each of the expression groups to classify the face images in each of the expression groups into one of the expression categories.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

FIGS. 7A to 7F are tables of experimental data recognizing face images according to an embodiment of the disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
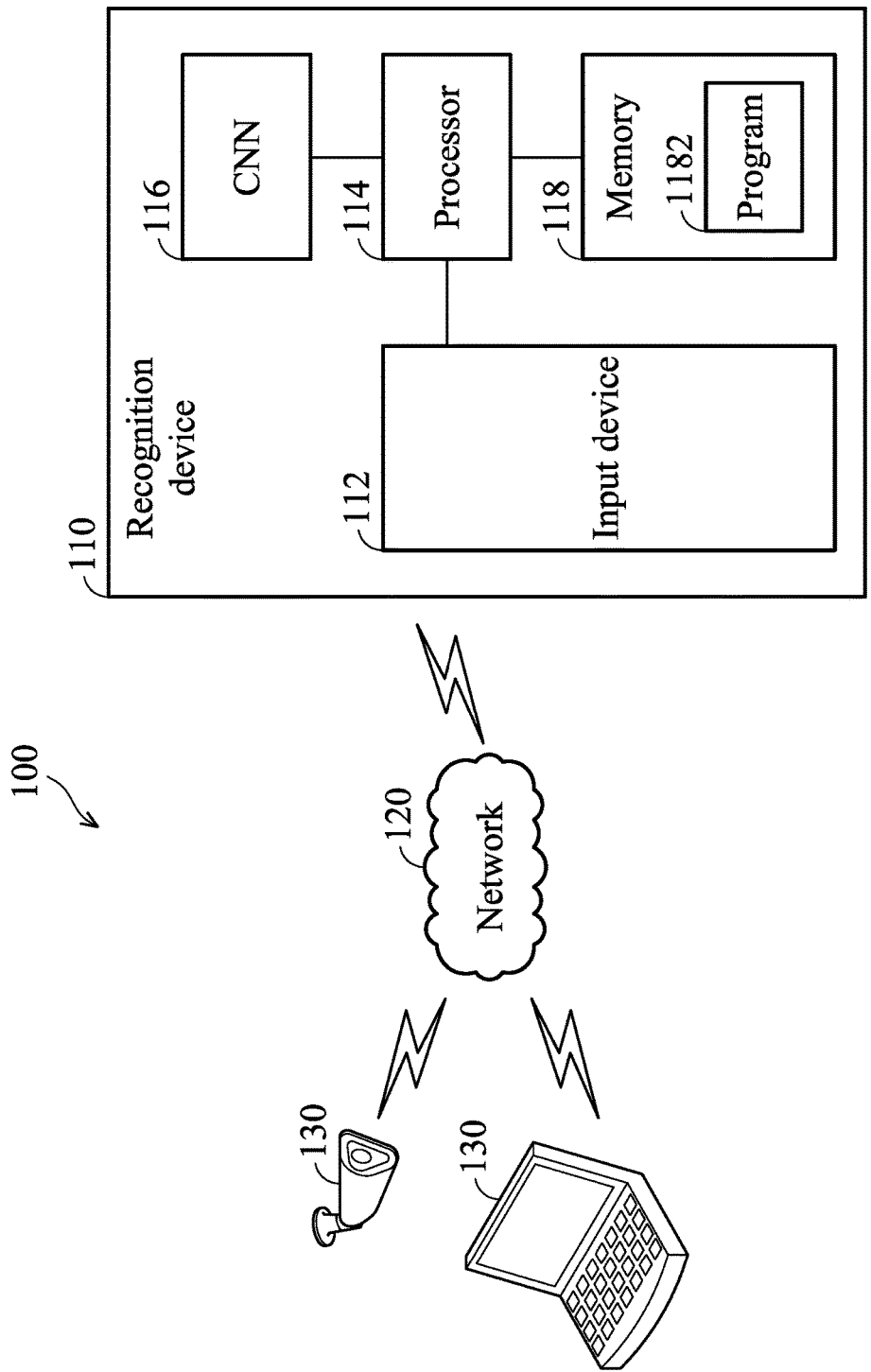
FIG. 1 shows a schematic diagram of a system for recognizing face expressions according to one embodiment of the present disclosure.

FIG. 1 shows a schematic diagram of a system 100 for recognizing face expressions according to one embodiment of the present disclosure. The system 100 for recognizing face expressions may include a recognition device 110 and an electronic device 130 connected to the network 120.

The recognition device 110 may include an input device 112, wherein the input device 112 is configured to receive input data from a variety of sources. For example, the recognition device 110 may receive image data from the network 120 or receive images transmitted by the electronic device 130. The recognition device 110 may receive training images including faces, and may further be trained as a recognizer configured to recognize a face according to the training images.

The recognition device 110 may include a processor 114, a convolutional neural network (CNN) 116 and a memory 118 which may store program 1182. In addition, the images may be stored in the memory 118 or stored in the convolutional neural network 116. In one embodiment, the convolutional neural network 116 may be implemented in the processor 114. In another embodiment, the recognition device 110 may be used with components, systems, subsystems, and/or devices other than those that are depicted herein.

The types of recognition device 110 range from small handheld devices, such as mobile telephones and handheld computers to large mainframe systems, such as mainframe computers. Examples of handheld computers include personal digital assistants (PDAs) and notebooks. The electronic device 130 can be connected to the recognition device 110 by using a network 120. The network 120 can include, but is not limited to, one or more local area networks (LANs), and/or wide area networks (WANs).

It should be understood that the recognition device 110 and the electronic device 130 shown in FIG. 1 is an example of one suitable system 100 architecture recognizing face expressions. Each of the components shown in FIG. 1 may be implemented via any type of computing device, such as the computing device 800 described with reference to FIG. 8, for example.

Figure 2:
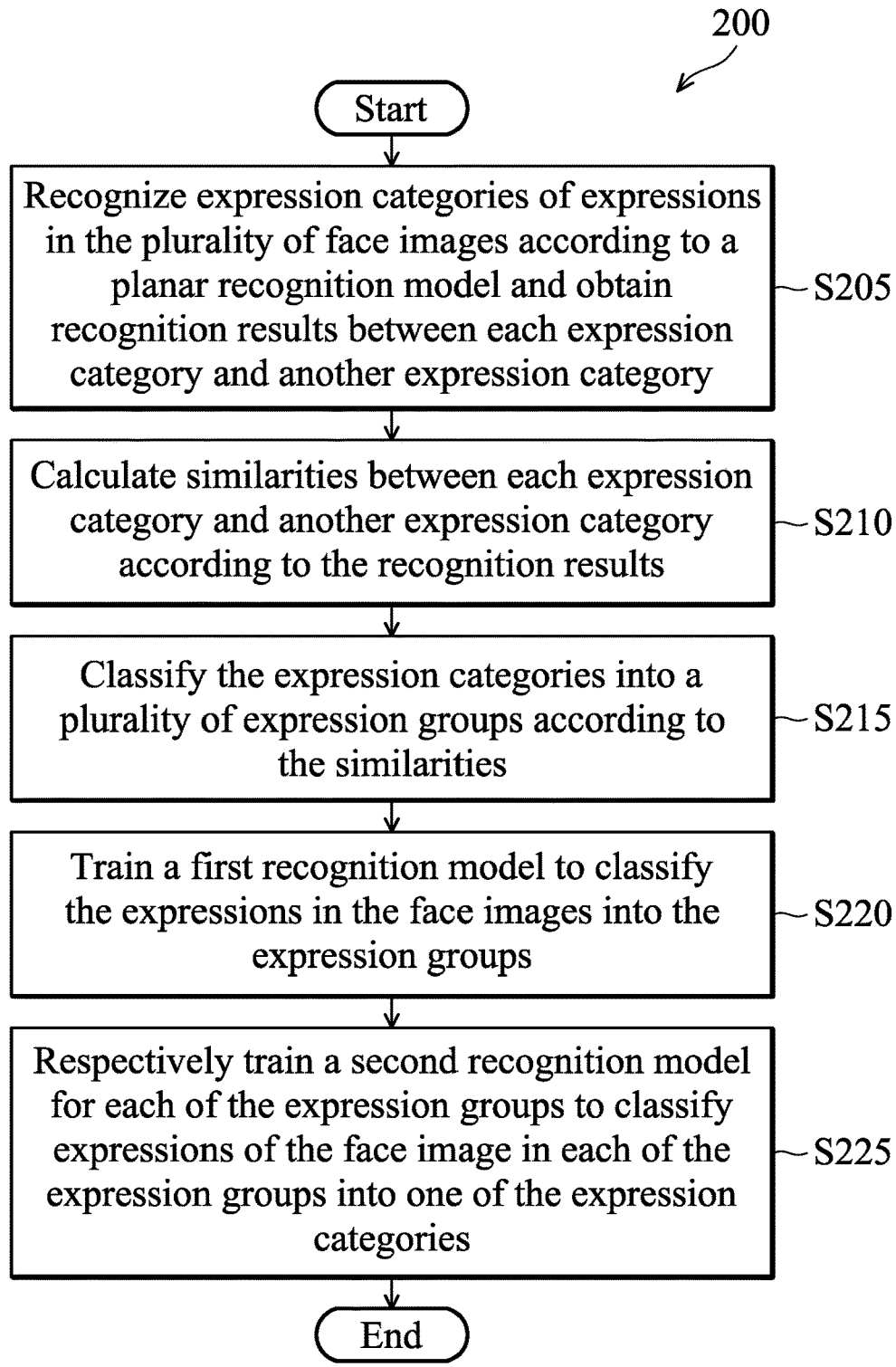
FIG. 2 is a flowchart illustrating a method for recognizing face expressions according to an embodiment of the present disclosure.

FIG. 2 is a flowchart illustrating a method 200 for recognizing face expressions according to an embodiment of the present disclosure. The method can be implemented in the processor of the recognition device 110 as shown in FIG. 1.

Before the start of the flowchart, the user may first input a plurality of face images for training to the recognition device. In step S205, the recognition device recognizes expression categories of expressions in the plurality of face images according to a planar recognition model and obtains recognition results between each expression category and another expression category, wherein the expression categories comprise anger, disgust, fear, happiness, sadness, and surprise. As used herein, the term "planar recognition model" refers to a model which is trained to directly classify face images into expression categories.

Next, in step S210, the recognition device calculates similarities between each expression category and another expression category according to the recognition results, wherein the similarity between a first expression category and a second expression category is calculated according to a cross entropy between the first expression category and the second expression category.

Specifically, the similarity S(p, q) between an expression category p and an expression category q may be expressed as follows:

$$S(p,q)=H(p,q)+H(q,p)$$

wherein H(p, q) and H(q, p) are the cross entropies between the expression category p and the expression category q, and the cross entropy H(p, q) is expressed as follows:

$$H(p, q) = -\left(\left(1 \times \ln\frac{TP_p}{TP_p + FP_{p,q}}\right) + \left(0 \times \ln\frac{FP_{p,q}}{TP_p + FP_{p,q}}\right)\right)$$

wherein $TP_p$ represents the number of expressions in the face images of the expression category p which are correctly recognized as the expression category p, and $FP_{p,q}$ represents the number of expressions in the face images of the expression category p which are incorrectly recognized as the expression category q. In the embodiment, the larger the value of the similarity S(p, q), the more similar the expression category p is to the expression type q.

In step S215, the recognition device classifies the expression categories into a plurality of expression groups according to the similarities. Next, in step S220, the recognition device trains a first recognition model to classify the expressions in the face images into the expression groups. In step S225, the recognition device respectively trains a second recognition model for each of the expression groups to classify expressions of the face image in each of the expression groups into one of the expression categories.

Therefore, the recognition device can train a first recognition model and a plurality of second recognition models through the method 200 in FIG. 2, wherein the number of second recognition models corresponds to the number of expression groups. When the recognition device receives an input image including a face, the recognition device can recognize the expression category of the expression in the input image by using the first recognition model and the second recognition models.

Figure 3:
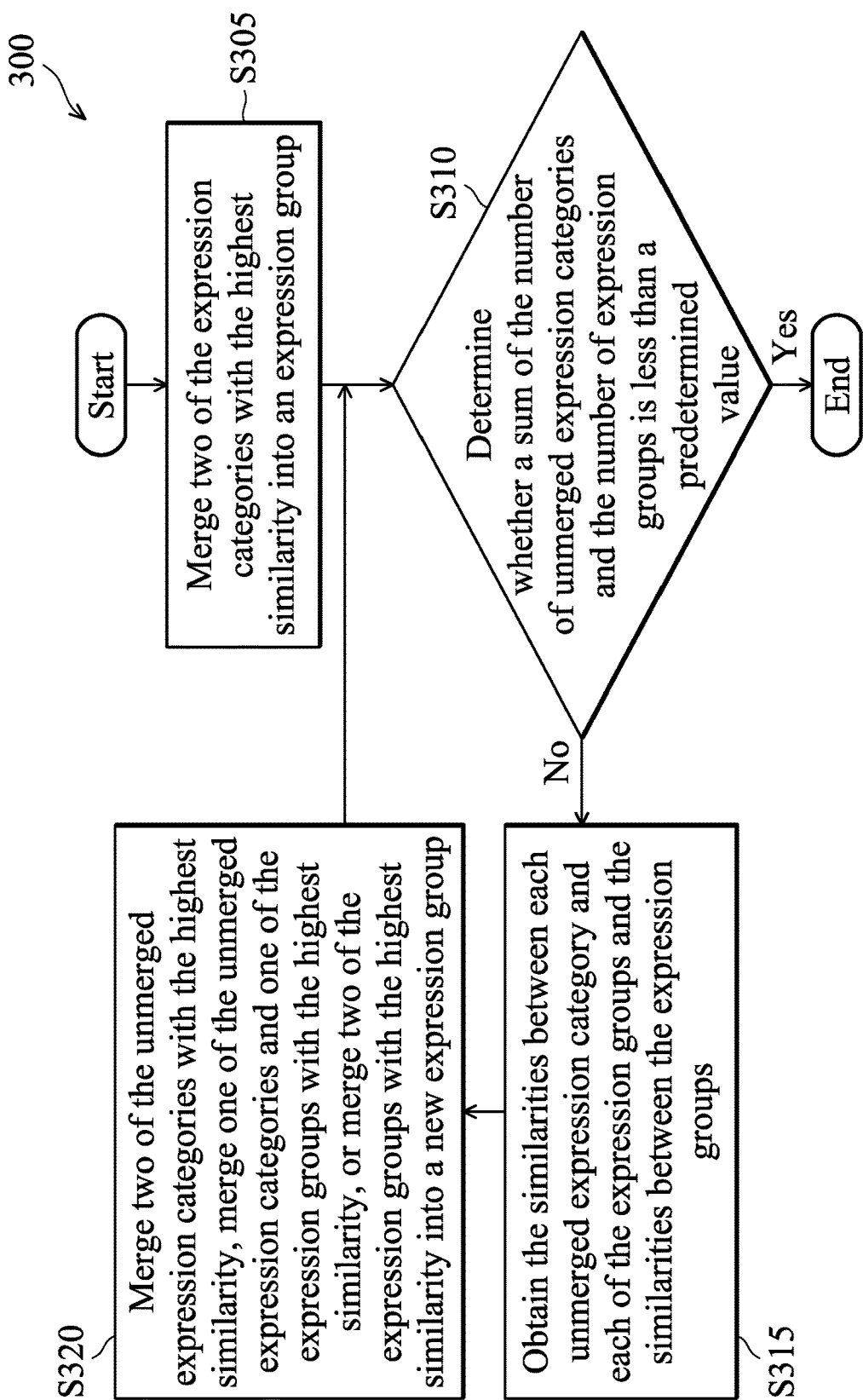
FIG. 3 is a flowchart illustrating that the recognition device classifies the expression categories into a plurality of expression groups according to the similarities in accordance with an embodiment of the present disclosure.

The following may explain in detail how the recognition device classifies the expression categories into a plurality of expression groups according to the similarities in step S215. FIG. 3 is a flowchart 300 illustrating that the recognition device classifies the expression categories into a plurality of expression groups according to the similarities in accordance with an embodiment of the present disclosure.

In step S305, the recognition device merges two of the expression categories with the highest similarity into an expression group according to the similarities obtained in step S210. Next, in step S310, the recognition device determines whether a sum of the number of unmerged expression categories and the number of expression groups is less than a predetermined value (for example, 4). When the recognition device determines that the sum of the number of unmerged expression categories and the number of expression groups is less than the predetermined value ("Yes" in step S310), the flow is ended.

When the recognition device determines that the sum of the number of unmerged expression categories and the number of expression groups is not less than the predetermined value ("No" in step S310), in step S315, the recognition device obtains the similarities between each unmerged expression category and each of the expression groups and the similarities between the expression groups. The calculation of the similarities between each of the unmerged expression category and each of the expression groups and the similarities between the expression groups in the present embodiment first calculates the cross entropies between each of the unmerged expression category and each of the expression groups and the cross entropies between the expression groups, and then adds the cross entropies to obtain the similarities. Next, in step S320, the recognition device continues to merge two of the unmerged expression categories with the highest similarity, merge one of the unmerged expression categories and one of the expression groups with the highest similarity, or merge two of the expression groups with the highest similarity into a new expression group. The steps S310, S315 and S320 are repeated until the sum is less than the predetermined value. In another embodiment, the determination condition in step S310 may also be determining whether the calculated similarities are lower than a predetermined threshold. When each of the similarities is lower than the predetermined threshold, the flow is ended. When each of the similarities is not lower than the predetermined threshold, the iterative operation is continued.

In an embodiment, the first recognition model trained in step S220 and the second recognition models trained in step S225 by the recognition device are based on a convolutional neural network (CNN) model.

It should be noted that, the term "training", as used herein, is used to recognize an object used to train a recognition model. Therefore, a training image refers to an image used to train the recognition model. Also, the training image may correspond to a classification of a target image.

Figure 4:
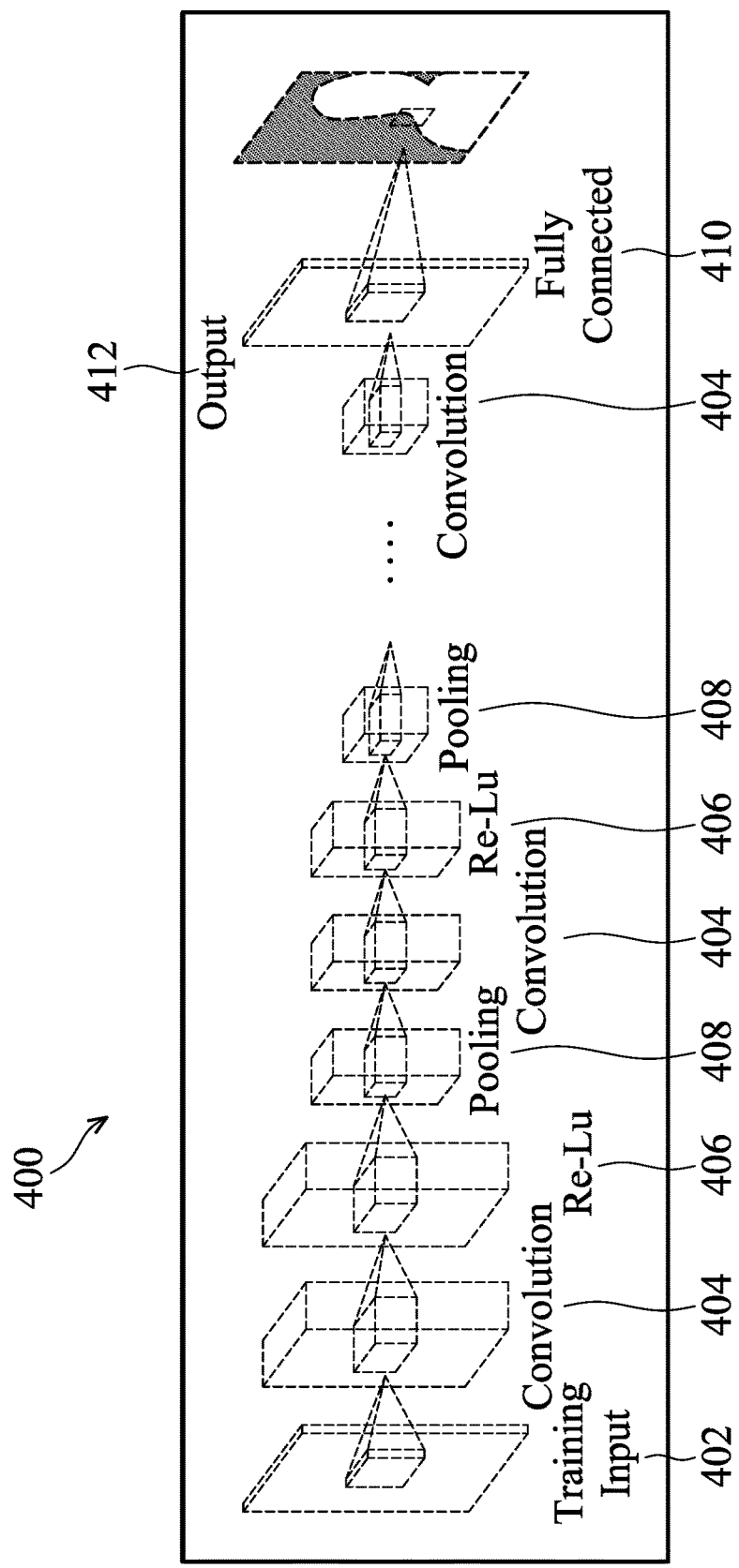
FIG. 4 illustrates a convolutional neural network according to an embodiment of the present disclosure.

For example, FIG. 4 illustrates a convolutional neural network 400 according to an embodiment of the present disclosure.

As shown in FIG. 4, the convolutional neural network 400 takes training input 402 (e.g., face images or face images belonging to an expression group) and through a series of applied layers, generates output 412. In particular, the convolutional neural network 400 utilizes a plurality of convolution layers 404, a plurality of Re—Lu layers 406, a plurality of pooling layers 408, and a plurality of fully connected layers 410. Utilizing these layers, the convolutional neural network 400 generates the output 412.

Figure 5:
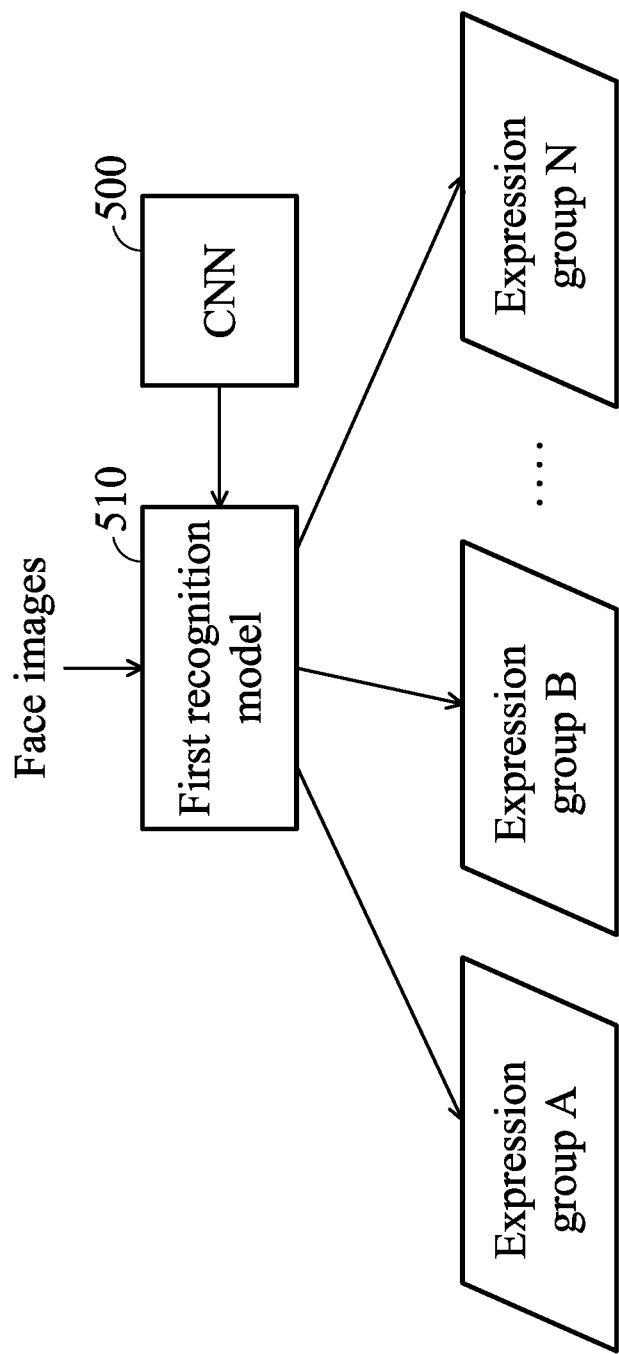
FIG. 5 is a schematic diagram illustrating a first recognition model trained by the convolutional neural network according to an embodiment of the present disclosure.
Figure 6:
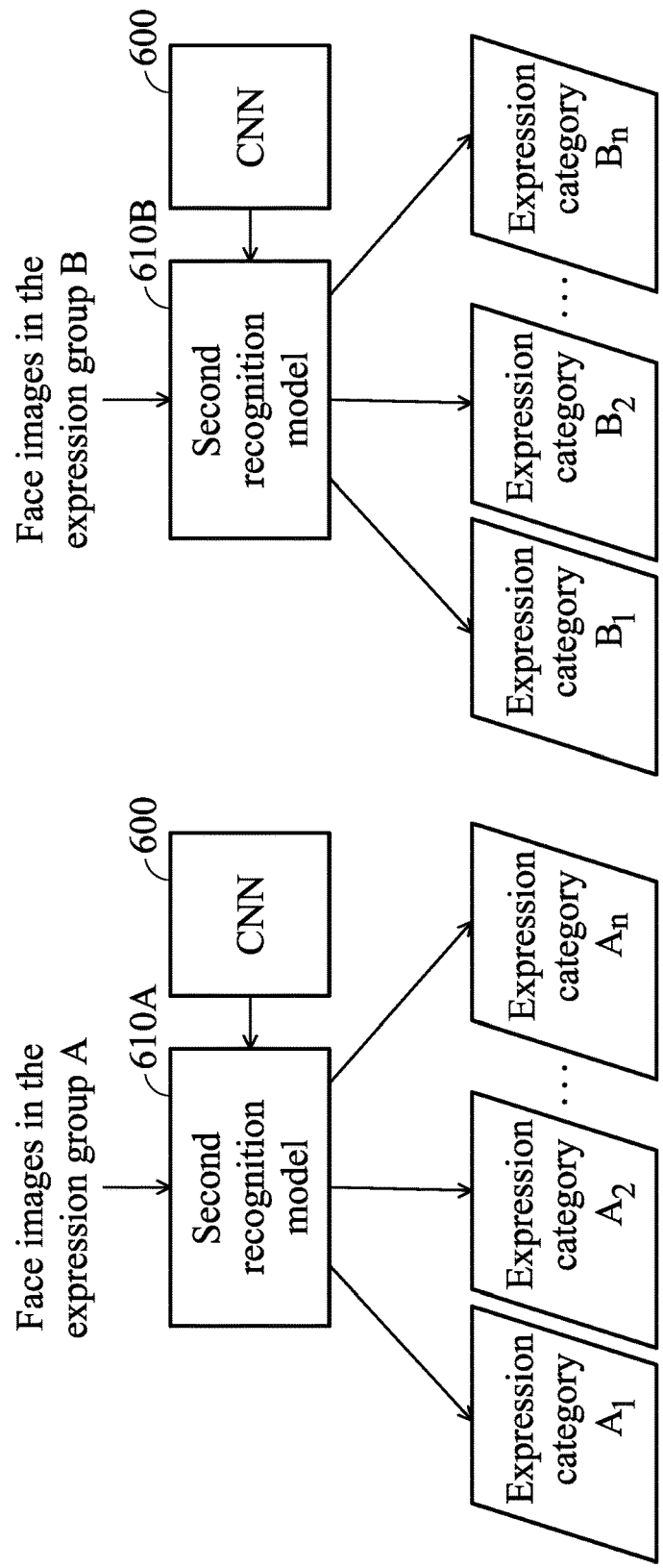
FIG. 6 is a schematic diagram illustrating a second recognition model trained by the convolutional neural network according to an embodiment of the present disclosure.

In other words, these layers can generate models for a variety of computer vision tasks such as image classification and detection. As shown in FIG. 5, these layers in the convolutional neural network 500 may help to train a first recognition model 510 to classify expressions in face images into a plurality of expression groups (expression group A, expression group B, . . . , expression group N). Similarly, as shown in FIG. 6, these layers in the convolutional neural network 600 may also train a second recognition model for each of the expression groups (expression group A, expression group B, . . . , expression group N) to classify expressions of the face images in the respective face expression group into one of the expression categories. For example, the second recognition model 610A is trained to classify each of the expressions of the face images in the expression group A into one of the expression categories, that is, each expression is classified into expression category $A_1$, expression category $A_2$, . . . , or expression category $A_n$. Similarly, the second recognition model 610B is trained to classify each of the expressions of the face images in the expression group B into one of the expression categories, that is, each expression is classified into expression category $B_1$, expression category $B_2$, . . . , or expression category $B_n$.

FIGS. 7A to 7F are tables of experimental data recognizing face images according to an embodiment of the disclosure, wherein the experimental data is generated by using 10-fold cross validation based on the collected face images which are used as training and test data. The number of collected face images is 19367, the number of face images used for testing is 1936, and the recognition device sets the predetermined value as 4 in advance.

The recognizing device recognizes the expression categories of the expressions in the face images based on a planar recognition model and obtains the recognition results between each expression category and another expression category, as shown in the table of FIG. 7A. The values in the table of FIG. 7A are the numbers of the expressions in the face images of the expression category p recognized as the expression category q.

Next, the recognition device may calculate the cross entropy $H(p, q)$ and $H(q, p)$ between each expression category and another expression category according to the recognition results in the table of FIG. 7A, as shown in the table of FIG. 7B. The recognition device then calculates the similarity $S(p, q)$ between each expression category and another expression category according to the table of FIG. 7B. As shown in the table of FIG. 7C, two of the expression categories with the highest similarity are anger and disgust. Therefore, the recognition device merges the two expression categories, anger and disgust, into one expression group. The table of FIG. 7D shows that the numbers of tested face images in each of the categories and the face expression group after the two expression categories, anger and disgust, are merged into one expression group.

Since the sum of the numbers of unmerged expressions and the number of expression groups is 6 and the recognition device determines that the sum is not less than the predetermined value, 4, the recognition device obtains the recognition results between each of the unmerged expression categories and the expression group according to the planar recognition model again. Next, the recognition device calculates the cross entropy $H(p, q)$ and $H(q, p)$ between each of the unmerged expression categories and the expression group according to the recognition results as shown in the table of FIG. 7E. The recognition device then calculates the similarities $S(p, q)$ between each of the unmerged expression categories and the expression group according to the table of FIG. 7E, as shown in the table of FIG. 7F. Obviously, the expression group including two categories (anger and disgust) and the expression category of fear have the highest two similarities. Therefore, the recognition device may merge the expression group including anger and disgust and the expression category of fear into another face expression group.

Since the sum of the number of unmerged expressions and the number of expression groups is 5, the recognition device determines that it is not less than the predetermined value, 4, the recognition device executes the flow described above again until the sum is less than the predetermined value, 4. The follow-up process is also described above, so the details will be omitted.

As described above, the method and device for recognizing face expressions recognition provided in the disclosure use the cross entropy to calculate the similarity between face expressions, and train two different recognition models to recognize the face images in two phases. The first recognition model in the first phase groups similar expression categories to avoid recognition interference between expression categories with lower similarities. The second recognition model in the second phase recognizes the expressions in each expression group to focus on training the ability to recognize the expressions with high similarities.

Figure 8:
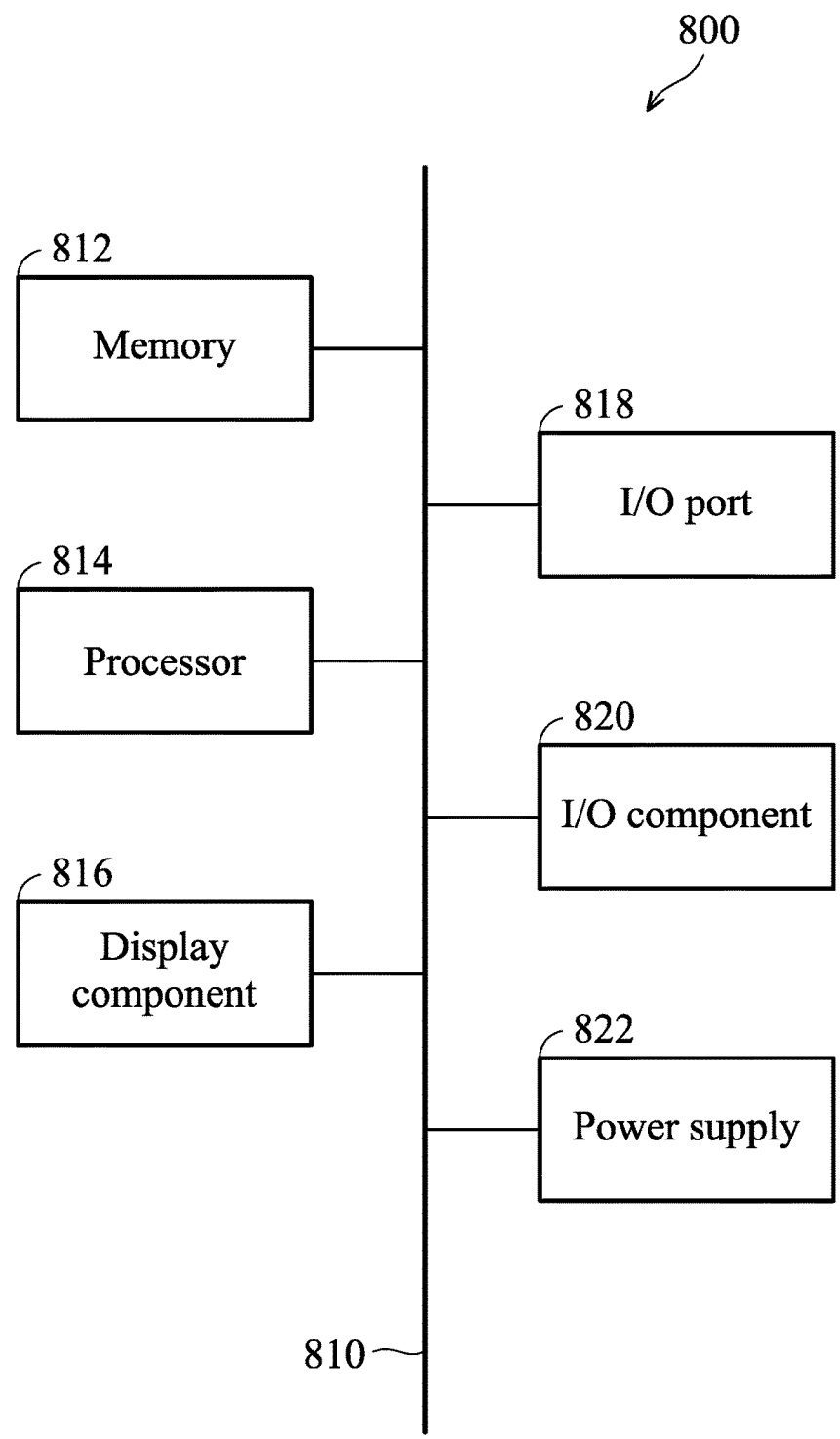
FIG. 8 illustrates an exemplary operating environment for implementing embodiments of the present disclosure.

Having described embodiments of the present disclosure, an exemplary operating environment in which embodiments of the present disclosure may be implemented is described below. Referring to FIG. 8, an exemplary operating environment for implementing embodiments of the present disclosure is shown and generally known as a computing device 800. The computing device 800 is merely an example of a suitable computing environment and is not intended to limit the scope of use or functionality of the disclosure. Neither should the computing device 800 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 8, the computing device 800 may include a bus 810 that is directly or indirectly coupled to the following devices: one or more memories 812, one or more processors 814, one or more display components 816, one or more input/output (I/O) ports 818, one or more input/output components 820, and an illustrative power supply 822. The bus 810 may represent one or more kinds of busses (such as an address bus, data bus, or any combination thereof). Although the various blocks of FIG. 8 are shown with lines for the sake of clarity, and in reality, the boundaries of the various components are not specific. For example, the display component such as a display device may be considered an I/O component and the processor may include a memory.

The computing device 800 typically includes a variety of computer-readable media. The computer-readable media can be any available media that can be accessed by computing device 800 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 800. The computer storage media may not comprise signal per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 812 may include computer-storage media in the form of volatile and/or nonvolatile memory. The memory may be removable, non-removable, or a combination thereof. Exemplary hardware devices include solid-state memory, hard drives, optical-disc drives, etc. The computing device 800 includes one or more processors that read data from various entities such as the memory 812 or the I/O components 820. The presentation component(s) 816 present data indications to a user or other device. Exemplary presentation components include a display device, speaker, printing component, vibrating component, etc.

The I/O ports 818 allow the computing device 800 to be logically coupled to other devices including the I/O components 820, some of which may be embedded. Illustrative components include a microphone, joystick, game pad, satellite dish, scanner, printer, wireless device, etc. The I/O components 820 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, face recognition, biometric recognition, gesture recognition both on screen and adjacent to the screen, air gestures, head and eye tracking, touch recognition associated with displays on the computing device 800, or any combination of. The computing device 800 may be equipped with depth cameras, such as stereoscopic camera systems, infrared camera systems, RGB camera systems, any combination of thereof to realize gesture detection and recognition. Furthermore, the computing device 800 may be equipped with accelerometers or gyroscopes that enable detection of motion. The output of the accelerometers or gyroscopes may be provided to the display of the computing device 700 to carry out immersive augmented reality or virtual reality.

Furthermore, the processor 814 in the computing device 800 can execute the program code in the memory 812 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for recognizing face expressions, comprising:
   recognizing expression categories of expressions in a plurality of face images and obtaining recognition results between each expression category and another expression category;
   obtaining similarities between each expression category and another expression category according to the recognition results;
   classifying the expression categories into a plurality of expression groups according to the similarities;
   training a first recognition model to classify the expressions in the face images into the expression groups; and
   training a second recognition model for each of the expression groups to classify the face images in each of the expression groups into one of the expression categories.

2. The method for recognizing face expressions as claimed in claim 1, wherein the similarity between a first expression category and a second expression category is obtained according to a cross entropy between the first expression category and the second expression category.

3. The method for recognizing face expressions as claimed in claim 1, wherein the similarity is expressed as follows:

$$S(p,q)=H(p,q)+H(q,p)$$

wherein S(p, q) is the similarity between an expression category p and an expression category q, H(p, q) and H(q, p) are the cross entropies between the expression category p and the expression category q, and the cross entropy H(p, q) is expressed as follows:

$$H(p,q) = -\left(\left(1 \times \ln\frac{TP_p}{TP_p + FP_{p,q}}\right) + \left(0 \times \ln\frac{FP_{p,q}}{TP_p + FP_{p,q}}\right)\right)$$

wherein $TP_p$ represents the number of expressions in the face images of the expression category p which are correctly recognized as the expression category p, and $FP_{p,q}$ represents the number of expressions in the face images of the expression category p which are incorrectly recognized as the expression category q.

4. The method for recognizing face expressions as claimed in claim 1, wherein the step of classifying the expression categories into the expression groups according to the similarities further comprises:
  merging two of the expression categories with the highest similarity into an expression group;
  obtaining the similarities between each unmerged expression category and the expression group; and
  merging one of the unmerged expression categories and the expression group with the highest similarity or merging two of the unmerged expression categories with the highest similarity into another expression group.

5. The method for recognizing face expressions as claimed in claim 4, wherein the step of classifying the expression categories into the expression groups according to the similarities further comprises:
  obtaining the similarity between the expression group and the other expression group; and
  merging the expression group and the other expression group with the highest similarity.

6. The method for recognizing face expressions as claimed in claim 4, wherein the similarities between each of the unmerged expression categories and the expression group is obtained according to the cross entropies between each of the unmerged expression categories and the expression group.

7. The method for recognizing face expressions as claimed in claim 4, further comprising:
  receiving an input image including a face; and
  recognizing an expression category of an expression in the input image by using the first recognition model and the second recognition model.

8. The method for recognizing face expressions as claimed in claim 1, wherein the expression categories comprise anger, disgust, fear, happiness, sadness, and surprise.

9. The method for recognizing face expressions as claimed in claim 1, wherein the first recognition model and the second recognition model are based on a convolutional neural network (CNN) model.

10. A device for recognizing face expressions, comprising:
  one or more processors; and
  one or more non-transitory computer storage media for storing one or more computer-readable instructions, wherein the processor is configured to drive the non-transitory computer storage media to execute the following tasks:
  recognizing expression categories of expressions in a plurality of face images and obtaining recognition results between each expression category and another expression category;
  obtaining similarities between each expression category and another expression category according to the recognition results;
  classifying the expression categories into a plurality of expression groups according to the similarities;
  training a first recognition model to classify the expressions in the face images into the expression groups; and
  training a second recognition model for each of the expression groups to classify the face images in each of the expression groups into one of the expression categories.

11. The device for recognizing face expressions as claimed in claim 10, wherein the similarity between a first expression category and a second expression category is obtained according to a cross entropy between the first expression category and the second expression category.

12. The device for recognizing face expressions as claimed in claim 10, wherein the similarity is expressed as follows:

$$S(p,q)=H(p,q)+H(q,p)$$

wherein S(p, q) is the similarity between an expression category p and an expression category q, H(p, q) and H(q, p) are the cross entropies between the expression category p and the expression category q, and the cross entropy H(p, q) is expressed as follows:

$$H(p, q) = -\left(\left(1 \times \ln\frac{TP_p}{TP_p + FP_{p,q}}\right) + \left(0 \times \ln\frac{FP_{p,q}}{TP_p + FP_{p,q}}\right)\right)$$

wherein $TP_p$ represents the number of expressions in the face images of the expression category p which are correctly recognized as the expression category p, and $FP_{p,q}$ represents the number of expressions in the face images of the expression category p which are incorrectly recognized as the expression category q.

13. The device for recognizing face expressions as claimed in claim 10, wherein the processor classifying the expression categories into the expression groups according to the similarities further execute the following tasks:
  merging two of the expression categories with the highest similarity into an expression group;
  obtaining the similarities between each unmerged expression category and the expression group; and
  merging one of the unmerged expression categories and the expression group with the highest similarity or merging two of the unmerged expression categories with the highest similarity into another expression group.

14. The device for recognizing face expressions as claimed in claim 13, wherein the processor classifying the expression categories into the expression groups according to the similarities further executes the following tasks:
  obtaining the similarity between the expression group and the other expression group; and
  merging the expression group and the other expression group with the highest similarity.

15. The device for recognizing face expressions as claimed in claim 13, wherein the similarities between each of the unmerged expression categories and the expression group is obtained according to the cross entropies between each of the unmerged expression categories and the expression group.

16. The device for recognizing face expressions as claimed in claim 13, the processor further execute the following tasks:
  receiving an input image including a face; and
  recognizing an expression category of an expression in the input image by using the first recognition model and the second recognition model.

17. The device for recognizing face expressions as claimed in claim 10, wherein the expression categories comprise anger, disgust, fear, happiness, sadness, and surprise.

18. The device for recognizing face expressions as claimed in claim 10, wherein the first recognition model and the second recognition model are based on a convolutional neural network (CNN) model.

* * * * *